（12) United States Patent
Rubino et al.

(10) Patent No.: US 6,984,468 B2
(45) Date of Patent: Jan. 10, 2006

(54) HERMETICALLY SEALED COIN CELL

(75) Inventors: Robert S. Rubino, Williamsville, NY (US); Hong Gan, East Amherst, NY (US); Joseph Prinzbach, North Tonawanda, NY (US); Esther S. Takeuchi, East Amherst, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 183 days.

(21) Appl. No.: 10/761,037

(22) Filed: Jan. 20, 2004

(65) Prior Publication Data

US 2004/0146780 A1 Jul. 29, 2004

Related U.S. Application Data

(60) Provisional application No. 60/441,015, filed on Jan. 17, 2003.

(51) Int. Cl.
*H01M 2/08* (2006.01)
(52) U.S. Cl. .................... 429/174; 429/162; 429/182
(58) Field of Classification Search ............... None
See application file for complete search history.

(56) References Cited

U.S. PATENT DOCUMENTS 3,712,836 A * 1/1973 Per Bro et al. ............ 429/164
3,957,496 A 5/1976 Eagan
4,047,292 A 9/1977 Shaffer
4,128,697 A 12/1978 Simpson
4,168,351 A 9/1979 Taylor
4,233,372 A 11/1980 Bro et al.
4,308,323 A * 12/1981 Bowsky ..................... 429/181
4,556,613 A 12/1985 Taylor et al.
4,609,598 A 9/1986 Tucholski et al.
5,004,656 A 4/1991 Sato et al.
5,807,644 A 9/1998 Blonsky et al.
5,952,121 A 9/1999 Blonsky et al.

FOREIGN PATENT DOCUMENTS

DE 38 22 733 A 2/1989
EP 0 360 039 3/1990
JP 55155465 12/1980

\* cited by examiner

*Primary Examiner*—John S. Maples

(57) ABSTRACT

A hermetically sealed coin cell is described. The coin cell has the opposite polarity terminals isolated from one another by a glass-to-metal seal. Glassing a conductive disc inside a ring of greater diameter and height forms this seal. The height of the ring is equivalent to the desired height of the cell. The disc acts as one cell terminal, which can be positive or negative, and the ring serves as the other terminal. In plan view, both terminals are on the same side of the cell. This allows for easy mounting and connection to an electric circuit board, and the like.

11 Claims, 5 Drawing Sheets

HERMETICALLY SEALED COIN CELL

CROSS-REFERENCE TO RELATED APPLICATION

The present application claims priority from U.S. provisional application Ser. No. 60/441,015, filed Jan. 17, 2003.

BACKGROUND OF THE INVENTION

1. Field of the Invention

The present invention generally relates to the conversion of chemical energy to electrical energy. More particularly, the present invention relates to a hermetically sealed coin-type cell. The cell is of either a primary or a secondary chemistry.

2. Prior Art

Implantable electrochemical cells are in widespread use. These cells are hermetically sealed using an insulating glass to separate the terminal pin from the case. Power sources of this type prevent internal components, such as the electrolyte, from coming into contact with body tissue or sensitive electrical components of the associated implantable medical device. These cells are easily manufactured in large sizes. However, as cell size becomes smaller, it becomes increasingly more complicated to perform the required welding and fabrication processes.

Often, coin cells are used in applications that require a very small power source. A top and bottom terminal crimped together with an insulating gasket characterizes coin cells. Contact between the electrodes and their current collectors are achieved by using stack pressure, which eliminates the need for welding the electrodes to the terminals. Also, since the number of parts is relatively small in a coin cell, this minimizes the need for many manufacturing operations. The problem with coin cells is, however, that the insulating gasket is typically of a polymeric or plastic material. Plastics are porous and do not constitute a hermetic seal. Also, these seals are unreliable and prone to leaking. As such, coin cells of the prior art are not suitable for implantable applications.

SUMMARY OF THE INVENTION

The present invention coin cell is distinguishable from those of the prior art in that the opposite polarity terminals are isolated from one another using a glass-to-metal seal. Glassing a conductive disc inside a ring of greater diameter and height forms this seal. The height of the ring is equivalent to the desired height of the cell. The disc acts as one cell terminal, which can be positive or negative, and the ring serves as the other terminal. In plan view, both terminals are on the same side of the cell. This allows for easy mounting and connection to an electronic circuit board, and the like.

These and other aspects of the present invention will become more apparent to those of ordinary skill on the art by reference to the following description and the appended drawings.

DETAILED DESCRIPTION OF THE PREFERRED EMBODIMENTS

Figure 1:
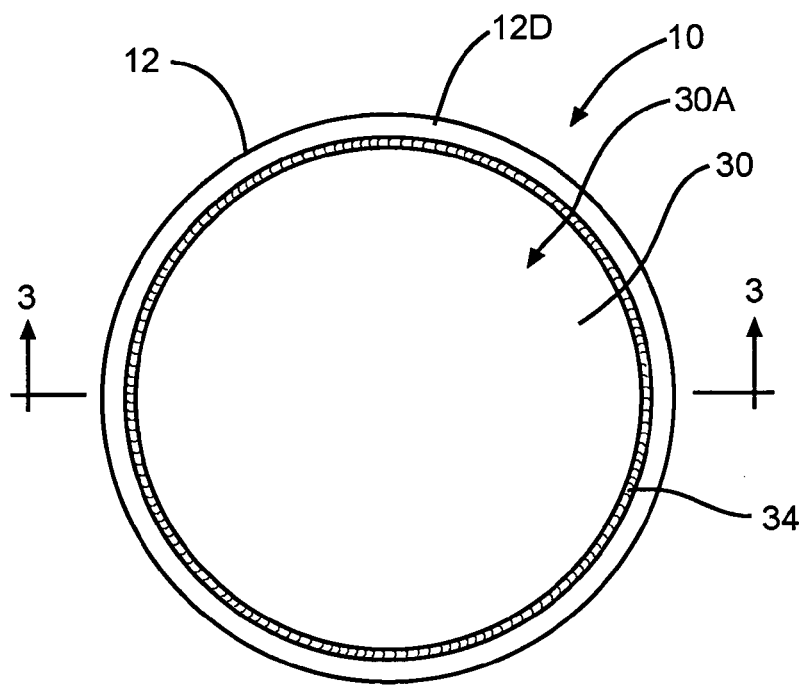
FIG. 1 is a top plan view of the coin cell 10 of the present invention.
Figure 2:
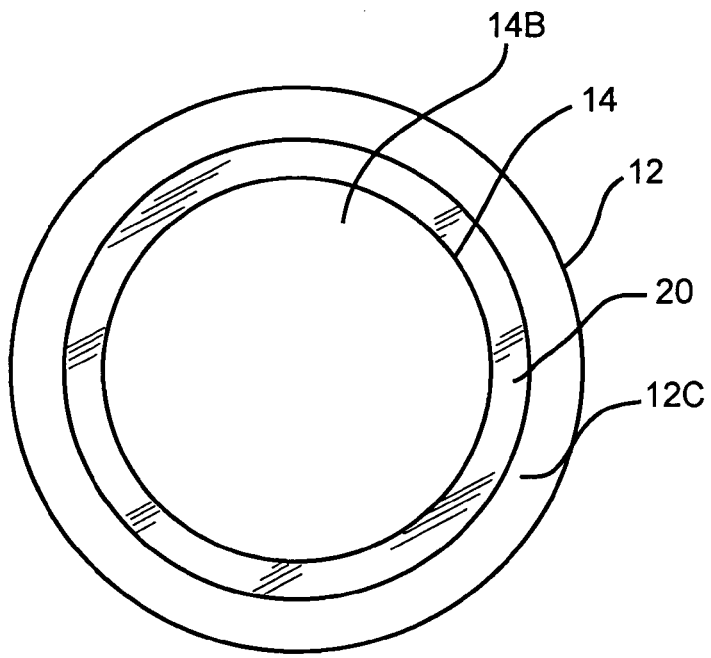
FIG. 2 is a bottom plan view of the coin cell 10 shown in FIG. 1.
Figure 3:
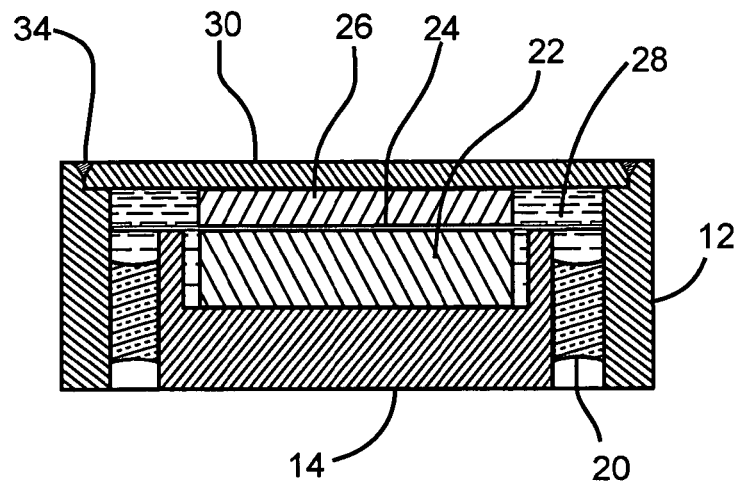
FIG. 3 is a cross-sectional view along line 3—3 of FIG. 1.
Figure 4:
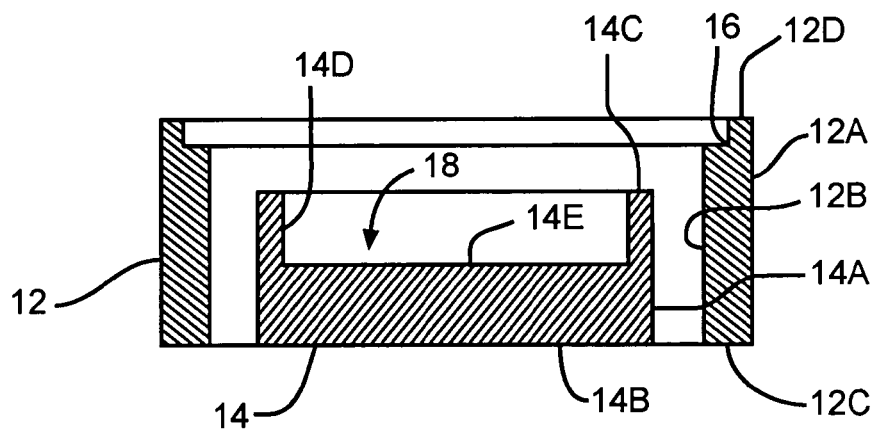
FIG. 4 is a cross-sectional view of the ring 12 and disc 14 for the coin cell 10.

Referring now to the drawings, FIGS. 1 to 9 show a coin cell 10 according to the present invention. The coin cell 10 comprises a cylindrically shaped ring 12 surrounding a circular disc 14. The ring 12 has a cylindrical outer wall 12A that is coaxial with a cylindrical inner wall 12B. The outer and inner walls 12A, 12B of the ring 12 extend to and meet with a spaced apart and perpendicularly oriented bottom or lower end 12C and a top or upper end 12D. The upper end 12D includes an annular step 16 adjacent to the inner wall 12B.

The disc 14 serves as a base for one of the electrodes and comprises a cylindrically shaped outer wall 14A extending to a perpendicularly oriented bottom or lower end 14B and a top or upper end 14C. A circular recess 18 is provided in the disc. The recess 18 comprises a cylindrical inner wall 14D extending to an inner bottom wall 14E. The disc lower end 14B and the inner lower wall 14E are parallel to each other. Further, the outer and inner cylindrical walls 14A, 14D are coaxial. The height of the inner wall 14D is from about 10% to about 90% of that of the outer wall 14A. This means that the thickness of the disc between the lower end 14B and the inner lower wall 14E is from about 10% to about 90% of the height of the outer wall 14A.

Figure 5:
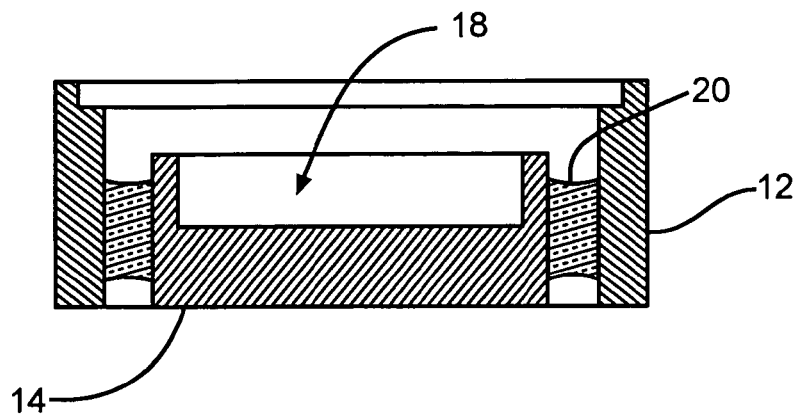
FIG. 5 is a cross-sectional view showing the insulative glass 20 sealing between the ring 12 and disc 14 of FIG. 4.
Figure 6:
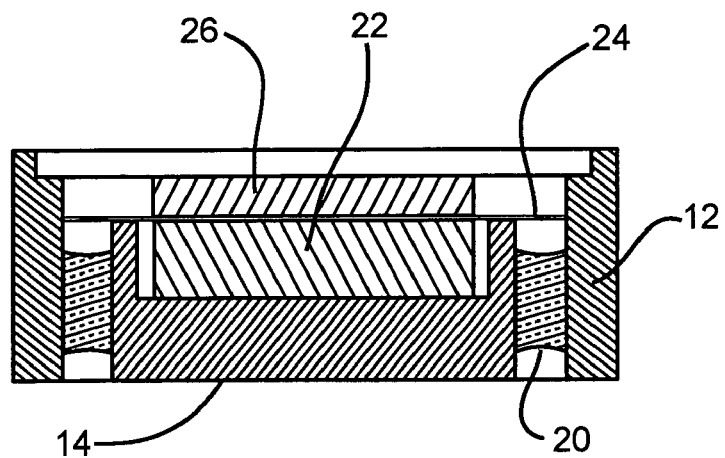
FIG. 6 is a cross-sectional view showing the positioning of the first and second electrodes 22 and 26 of the coin cell of FIG. 5.
Figure 7:
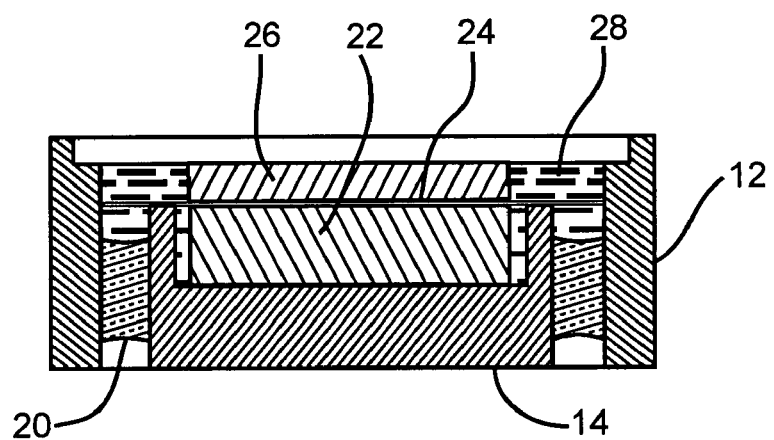
FIG. 7 is a cross-sectional view showing the electrolyte 28 activating the electrodes 22, 26 of FIG. 6.
Figure 8:
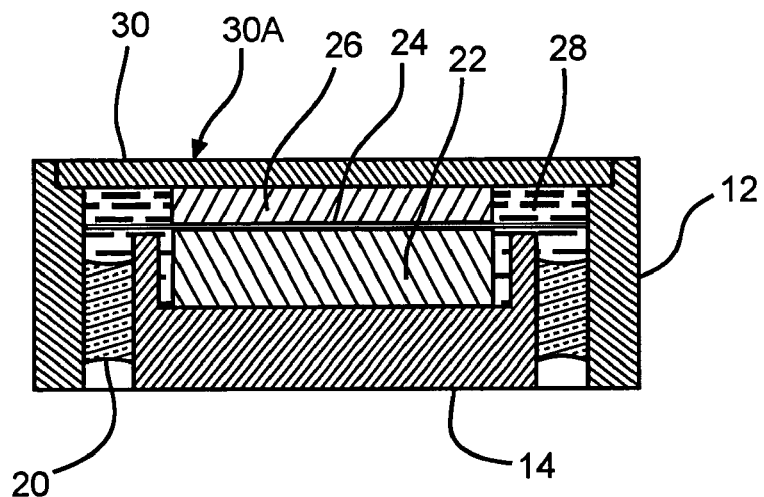
FIG. 8 is a cross-sectional view showing the plate 30 closing the coin cell of FIG. 7.

The disc 14 is sized to fit inside the ring 12. As shown in FIGS. 3 to 9, with the ring lower end 12C aligned coplanar with the disc lower end 14B, the disc upper end 14C is spaced from and below the ring upper end 12D. With the disc in a coaxial relationship with the ring, the disc outer wall 14A is spaced from the ring inner wall 12B. An insulative glass 20 seals in an annular manner between the ring inner wall 12B and the disc outer wall 14A (FIG. 5). This serves to hermetically seal the disc to the ring.

A first electrode 22 of an electrode active material is nested in the recess 18. The first electrode comprises spaced apart upper and lower major sides. The upper electrode side is shown substantially coplanar with the disc upper end 14C; however, this is not necessary. The electrode upper side can be spaced above disc upper end 14C, if desired.

An insulating separator 24 resting on the disc upper end 14C spans the entire area surrounded by the ring inner wall 12B. A second electrode 26 of an opposite polarity as the first electrode is then positioned on the opposite side of the separator 24.

As previously discussed, the coin cell 10 is of either a primary chemistry or a secondary, rechargeable chemistry. However, the coin cell will be described with respect to the second electrode 26 being the anode or negative electrode and the first electrode 22 being the cathode or positive electrode. For both the primary and secondary types, the anode active metal of the second electrode 26 is selected from Groups IA, IIA and IIIB of the Periodic Table of the Elements, including lithium, sodium, potassium, etc., and their alloys and intermetallic compounds including, for example, Li—Si, Li—Al, Li—B, Li—Mg, and Li—Si—B alloys. The preferred metal comprises lithium. An alternate negative electrode comprises a lithium alloy, such as lithium-aluminum alloy. The greater the amounts of aluminum present by weight in the alloy, however, the lower the energy density of the cell.

For a primary coin cell, the anode 26 is a thin metal sheet or foil or pellet of the lithium material. In secondary electrochemical systems, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glassy carbon, etc.), which are capable of reversibly retaining the lithium species, is preferred. A "hairy carbon" material is particularly preferred due to its relatively high lithium-retention capacity. "Hairy carbon" is a material described in U.S. Pat. No. 5,443,928 to Takeuchi et al. This patent is assigned to the assignee of the present invention and incorporated herein by reference. Graphite is another preferred material. Regardless of the form of the carbon, fibers of the carbonaceous material are particularly advantageous because they have excellent mechanical properties, which permit them to be fabricated into rigid electrodes that are capable of withstanding degradation during repeated charge/discharge cycling. Moreover, the high surface area of carbon fibers allows for rapid charge/discharge rates.

A typical negative electrode for a secondary cell is fabricated by mixing about 90 to 97 weight percent "hairy carbon" or graphite with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof.

In either the primary or secondary system, the reaction at the positive electrode 22 involves conversion of ions, which migrate from the negative electrode 26 to the positive electrode into atomic or molecular forms. For a primary cell, the cathode active material comprises a carbonaceous chemistry or at least a first transition metal chalcogenide constituent which may be a metal, a metal oxide, or a mixed metal oxide comprising at least a first and a second metals or their oxides, and possibly a third metal or metal oxide, or a mixture of a first and a second metals or their metal oxides incorporated in the matrix of a host metal oxide. The cathode active material may also comprise a metal sulfide.

Carbonaceous active materials are preferably prepared from carbon and fluorine, which includes graphitic and nongraphitic forms of carbon, such as coke, charcoal or activated carbon. Fluorinated carbon is represented by the formula $(CF_x)_n$, wherein x varies between about 0.1 to 1.9 and preferably between about 0.5 and 1.2, and $(C_2F)_n$, wherein n refers to the number of monomer units, which can vary widely.

The metal oxide or the mixed metal oxide is produced by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII, which include the noble metals and/or other oxide and sulfide compounds. A preferred cathode active material is a reaction product of at least silver and vanadium.

One preferred mixed metal oxide has the general formula $SM_xV_2O_y$ where SM is a metal selected from Groups IB to VIIB and VIII of the Periodic Table of Elements, and wherein x is about 0.30 to 2.0 and y is about 4.5 to 6.0 in the general formula. One exemplary cathode active material comprises silver vanadium oxide having the general formula $Ag_xV_2O_y$ in any one of its many phases, i.e., β-phase silver vanadium oxide having in the general formula x=0.35 and y =5.8, γ-phase silver vanadium oxide having in the general formula x=0.80 and y=5.40 and ε-phase silver vanadium oxide having in the general formula x=1.0 and y=5.5, and combination and mixtures of phases thereof. For a more detailed description of such cathode active materials reference is made to U.S. Pat. No. 4,310,609 to Liang et al. This patent is assigned to the assignee of the present invention and incorporated herein by reference.

Another preferred composite cathode active material for primary cells has the general formula $Cu_xAg_yV_2O_z$ (CSVO) and the range of material compositions is preferably about $0.01 \leq x \leq 1.0$, about $0.01 \leq y \leq 1.0$ and about $5.01 \leq z \leq 6.5$. For a more detailed description of this cathode active material, reference is made to U.S. Pat. Nos. 5,472,810 to Takeuchi et al. and 5,516,340 to Takeuchi et al., both of which are assigned to the assignee of the present invention and incorporated herein by reference.

In addition to the previously described fluorinated carbon, silver vanadium oxide and copper silver vanadium oxide, $Ag_2O$, $Ag_2O_2$, $CuF_2$, $Ag_2CrO_4$, $MnO_2$, $V_2O_5$, $MnO_2$, $TiS_2$, $Cu_2S$, FeS, $FeS_2$, copper oxide, copper vanadium oxide, and mixtures thereof are contemplated as useful active materials.

In secondary coin cell, the positive electrode 22 preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

To charge such secondary coin cells, lithium ions comprising the positive electrode 22 are intercalated into the carbonaceous negative electrode 26 by applying an externally generated electrical potential to the cell. The applied recharging electrical potential serves to draw lithium ions from the cathode active material, through the electrolyte and into the carbonaceous material of the negative electrode to saturate the carbon. The resulting $Li_xC_6$ negative electrode can have an x ranging from 0.1 to 1.0. The cell is then provided with an electrical potential and is discharged in a normal manner.

An alternate secondary cell construction comprises intercalating the carbonaceous material with the active lithium material before the negative electrode is incorporated into the cell. In this case, the positive electrode body can be solid and comprise, but not be limited to, such active materials as manganese dioxide, silver vanadium oxide, titanium disulfide, copper oxide, copper sulfide, iron sulfide, iron disulfide and fluorinated carbon. However, this approach is compromised by problems associated with handling lithiated carbon outside of the cell. Lithiated carbon tends to react when contacted by air or water.

The above described cathode active materials, whether of a primary or a secondary chemistry, are formed into an electrode body for incorporation into a coin cell by mixing one or more of them with a binder material. Suitable binders are powdered fluoro-polymers; more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 1 to 5 weight percent, a conductive diluent present at about 1 to 5 weight percent and about 90 to 98 weight percent of the cathode active material.

Whether the coin cell 10 is constructed as a primary or secondary electrochemical system, the separator 24 physically segregates the anode 26 and cathode active materials 22. The separator is of an electrically insulative material to prevent an internal electrical short circuit between the electrodes, and also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. The form of the separator typically is a sheet placed between the anode and cathode electrodes. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

After the electrodes 22, 26 are housed in the ring/disc assembly, an electrolyte 28 is filled therein. The electrolyte is provided into the disc recess 18 and the ring 12 in an amount substantially level with the step 16 meeting the ring inner wall 12B. Suitable nonaqueous electrolytes comprise an inorganic salt dissolved in a nonaqueous solvent, and more preferably an alkali metal salt dissolved in a mixture of aprotic organic solvents comprising a low viscosity solvent including organic esters, ethers and dialkyl carbonates, and mixtures thereof, and a high permittivity solvent including cyclic carbonates, cyclic esters and cyclic amides, and mixtures thereof. Suitable nonaqueous solvents are substantially inert to the anode and cathode electrode materials and preferred low viscosity solvents include tetrahydrofuran (THF), methyl acetate (MA), diglyme, triglyme, tetraglyme, dimethyl carbonate (DMC), diethyl carbonate (DEC), dipropyl carbonate (DPC), methyl ethyl carbonate (MEC), methyl propyl carbonate (MPC), ethyl propyl carbonate (EPC), 1,2-dimethoxyethane (DME), and mixtures thereof. Preferred high permittivity solvents include propylene carbonate (PC), ethylene carbonate (EC), butylene carbonate (BC), acetonitrile, dimethyl sulfoxide, dimethyl formamide, dimethyl acetamide, γ-butyrolactone (GBL), γ-valerolactone, N-methyl-pyrrolidinone (NMP), and mixtures thereof.

Known lithium salts that are useful as a vehicle for transport of alkali metal ions from the anode to the cathode, and back again include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiNO_3$, $LiO_2CCF_3$, $LiN(SO_2CF_3)_2$, LiSCN, $LiO_3SCF_2CF_3$, $LiC_6F_5SO_3$, $LiO_2CF_3$, $LiSO_3F$, $LiB(C_6H_5)_4$, $LiCF_3SO_3$, and mixtures thereof. Suitable salt concentrations typically range between about 0.8 to 1.5 molar.

A preferred electrolyte for a secondary cell of an exemplary carbon/$LiCoO_2$ couple comprises a solvent mixture of EC:DMC:EMC:DEC. Most preferred volume percent ranges for the various carbonate solvents include EC in the range of about 20% to about 50%; DMC in the range of about 12% to about 75%; EMC in the range of about 5% to about 45%; and DEC in the range of about 3% to about 45%. In a preferred form of the coin cell 10, the electrolyte is at equilibrium with respect to the ratio of DMC:EMC:DEC. This is important to maintain consistent and reliable cycling characteristics. It is known that due to the presence of low-potential (anode) materials in a charged cell, an unequilibrated mixture of DMC:DEC in the presence of lithiated graphite ($LiC_6 \approx 0.01$ V vs. $Li/Li^+$) results in a substantial amount of EMC being formed. When the concentrations of DMC, DEC and EMC change, the cycling characteristics and temperature rating of the cell changes. Such unpredictability is unacceptable. This phenomenon is described in detail in U.S. patent application Ser. No. 10/232,166, filed Aug. 30, 2002, which is assigned to the assignee of the present invention and incorporated herein by reference. Electrolytes containing the quaternary carbonate mixture of the present invention exhibit freezing points below −50° C., and lithium ion secondary cells activated with such mixtures have very good cycling behavior at room temperature as well as very good discharge and charge/discharge cycling behavior at temperatures below −40° C.

Figure 9:
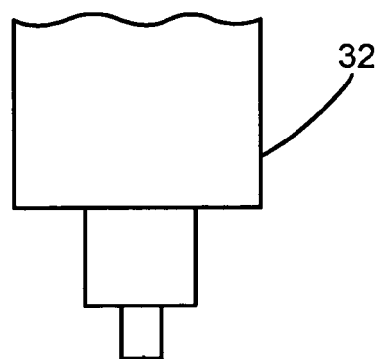
FIG. 9 is a schematic showing a laser 32 welding the plate 30 to the ring 12 to hermetically close the coin cell of FIG. 8.
Figure 9:
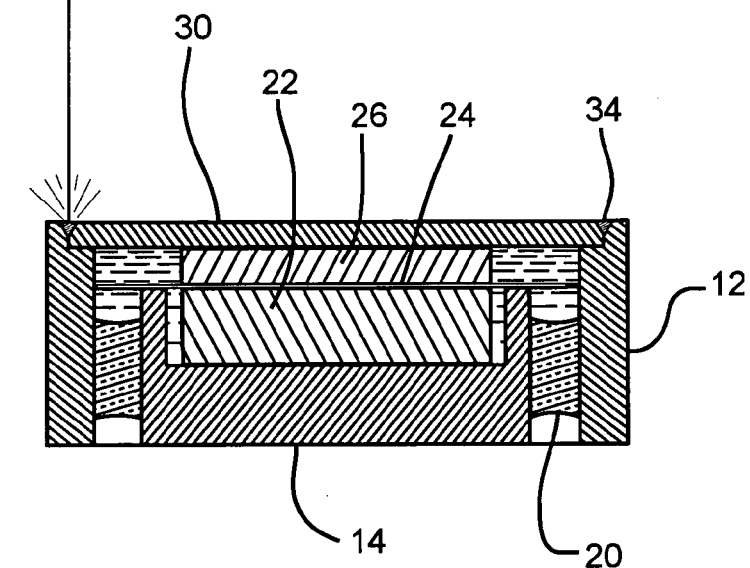

A circular plate serving as a lid 30 is then fitted into the step 16. The lid is of a size and thickness to rest on the step with its upper surface 30A coplanar with the ring upper end 12D. Next, the cell 10 is hermetically sealed closed by securing the lid 30 to the ring 12. This is done by any one of a number of methods including soldering and welding. If the later technique is used, a laser 32 provides the weld 34 between the ring 12 and the lid 30, as shown in FIG. 9. Preferably, the cell is set in a heat-sinking fixture (not shown) during welding to minimize heating of the cell components.

After the lid 30 is welded in place, a compressive force is applied to the center of the lid. In that manner, the lid compresses the electrode materials 22, 26 housed inside cell. The resulting stack pressure is illustrated in the completed cell of FIG. 3 where the first and second electrode 22, 26 are in a tightly fitting relationship captured between the disc inner lower wall 14E and the lid 30.

An important aspect of the present coin cell is the materials of construction for the ring 12, disc 14, glass 20 and lid 30. The selection of materials for these parts is critical as they must be compatible with the chemistry and potential expected in the cell to prevent possible corrosion. Also, the ring 12, disc 14 and glass 20 must be capable of forming a hermetic glass-to-metal seal. A compression seal is typically used to provide the reliability required for an implantable application. In such a seal, the coefficient of thermal expansion of the ring 12 is greater than that of the glass 20, which, in turn, is greater than that of the disc 14. When the first electrode 22 is the cathode and the second electrode 26 is the anode, suitable exemplary materials for the disc 14 are titanium, and molybdenum, and alloys thereof, which have a relatively low coefficient of linear expansion. Stainless steel, which has a high coefficient of linear expansion, is suitable for the ring 12 and lid 30. If desired, these metal parts are coated with a secondary metal or carbon to provide compatibility with the desired electrochemical system.

It is also contemplated by the scope of the present invention that the first electrode 22 is the anode and the second electrode 26 is the cathode. In that case, nickel, titanium, and molybdenum, and alloys thereof are a suitable material for the disc 14 while stainless steel is suitable for the ring 12 and lid 30.

Figure 10:
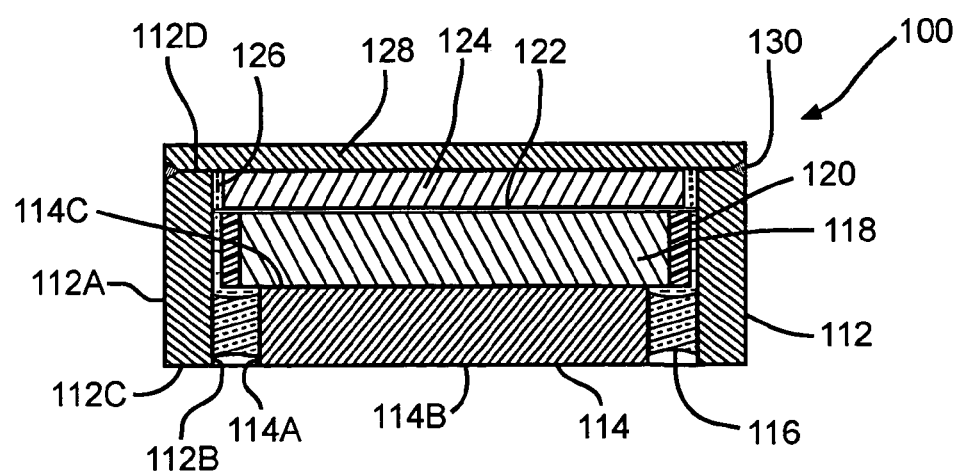
FIG. 10 is a cross-sectional view showing an alternate embodiment of a coin cell 100 according to the present invention.

FIG. 10 shows an alternate embodiment of a coin cell 100 according to the present invention. The coin cell 100 comprises a cylindrically shaped ring 112 surrounding a circular disc 114. The ring 112 has a cylindrical outer wall 112A coaxial with a cylindrical inner wall 112B. The outer and inner walls 112A, 112B extend to and meet with spaced apart perpendicularly oriented lower and upper ends 112C and 112D.

The disc 114 comprises a cylindrically shaped outer wall 114A extending to perpendicularly oriented outer lower end 114B and upper end 114C. The disc 114 is sized to fit inside the ring 112. With the ring lower end 112C aligned coplanar with the disc lower end 114B, the disc upper end 114C is spaced from and below the ring upper end 112D. With the disc in a coaxial relationship with the ring, the disc outer wall 114A is spaced from the ring inner wall 112B. An insulative glass 116 seals in an annular manner between the ring inner wall 112B and the disc outer wall 114A. This serves to hermetically seal the disc to the ring.

A first electrode 118 of an electrode active material is positioned on the disc upper end 114C. A ring 120 of an insulative material surrounds the first electrode. An insulating separator 122 spans the entire area surrounded by the ring inner wall 112B. A second electrode 124 of an opposite polarity as the first electrode is then positioned on the opposite side of the separator 122. Preferably, the insulative ring 120 and the separator 122 are of one the polymeric materials previously described as being suitable for the separator 24 of coin cell 10. An electrolyte 126 is provided in the cavity formed by the disc 114 glassed to the ring 112. Then, a lid 128 secured to the ring upper end 112D by weld 130 completes the cell 110.

Figure 11:
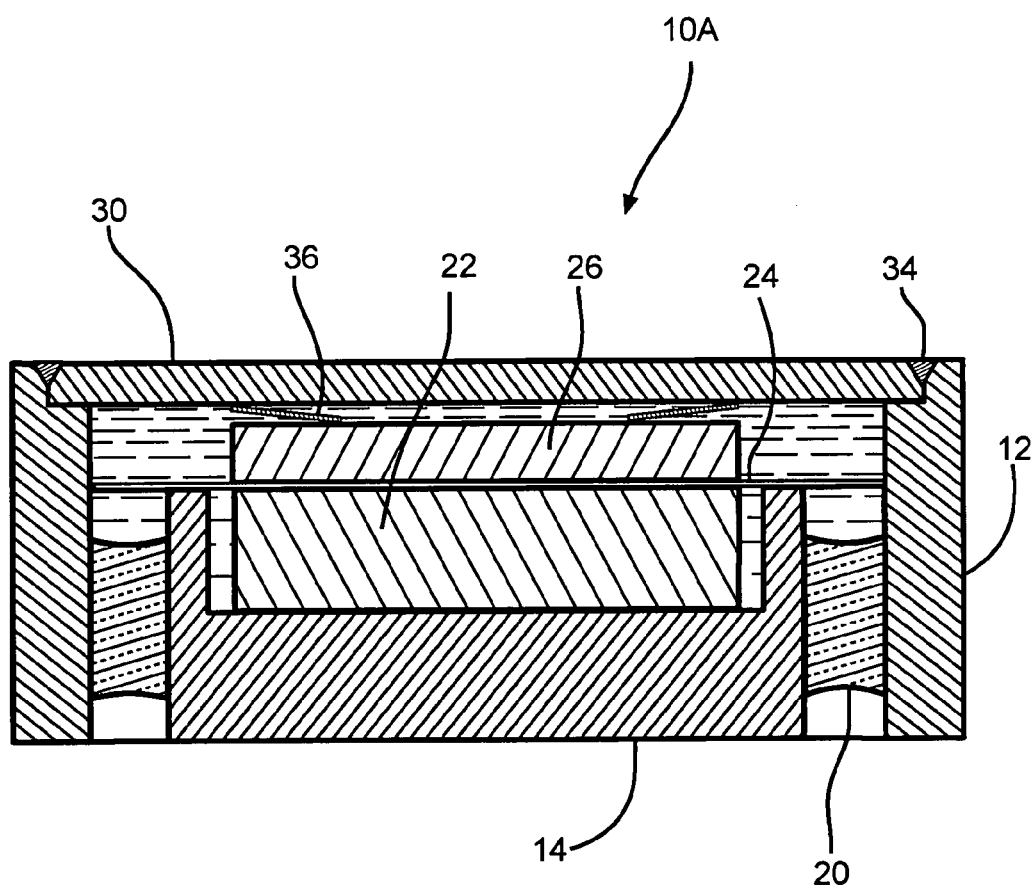
FIG. 11 is a cross-sectional view showing another embodiment of a coin cell 10A having a spring 36 captured between the second electrode 26 and lid 30 to provide stack pressure for the electrode assembly.

An alternative embodiment of the present coin cell 10A is shown in FIG. 11 having a spring 36 captured between the second electrode 26 and the lid 30 to provide stack pressure. The spring 36 is preferably of a Belleville type having its small diameter biasing against the second electrode 26 and its large diameter biasing against the lid 30. This spring orientation applies an axial stack pressure to the electrodes 22, 26 that helps promote complete and efficient discharge. If desired, a wave spring (not shown) can be used instead of the Belleville spring.

Thus, it is apparent that various embodiments of hermitically sealed coin cells of both a primary and a secondary chemistry have been described. Such cells have many applications where a power source of a relatively small size is desirable. However, a particularly preferred application is powering an implantable medical device, such as a cardiac pacemaker, defibrillator, neurostimulator, and the like. These devices require a long life, hermetically sealed power source. The present coin cells 10, 10A and 100 fulfill this requirement.

It is appreciated that various modifications to the present inventive concepts described herein may be apparent to those of ordinary skill in the art without departing from the scope of the present invention as defined by the herein appended claims.

What is claimed is:

1. An electrochemical cell, which comprises:
    a) a ring having a surrounding ring sidewall extending to a ring upper end and a ring lower end;
    b) a base having a surrounding base sidewall extending to a base upper end and a base lower end, wherein the ring surrounds the base with the base upper end spaced below the ring upper end;
    c) a glass material extending to and sealing with the ring sidewall and the base sidewall;
    d) a first electrode supported on the base upper end, the first electrode having spaced apart upper and lower first electrode sides with the first lower electrode side proximate the base upper end and the first upper electrode side spaced below the ring upper end;
    e) a separator supported on the first upper electrode side;
    f) a second, counter electrode having spaced apart upper and lower second electrode sides with the second lower electrode side supported on the separator and the second upper electrode side spaced below the ring upper end;
    g) an electrolyte activating the first and second electrodes; and
    h) a plate seated to the ring upper end.

2. The cell of claim 1 wherein the base comprises a recess into which the first electrode is nested.

3. The cell of claim 2 wherein with the first electrode nested in the recess of the base, the upper end of the first electrode is either substantially coplanar with the base upper end or spaced above the base upper end.

4. The cell of claim 1 wherein the plate applies stack pressure to the first and second electrodes.

5. The cell of claim 1 wherein a spring biases between the plate and the second electrode to apply stack pressure to the first and second electrodes.

6. The cell of claim 1 wherein the ring lower end and the base lower end are coplanar.

7. The cell of claim 1 wherein the ring upper end includes a step that receives the plate.

8. The cell of claim 1 including an insulative ring surrounding the first electrode.

9. The cell of claim 1 of either a primary or a secondary chemistry powering an implantable medical device.

10. The cell of claim 1 wherein the first electrode is a cathode of a cathode active material capable of intercalating or intercalating and deintercalating lithium and the second electrode is an anode comprised of lithium or an anode active material capable of intercalating and deintercalating lithium.

11. The cell of claim 1 wherein the base is selected from the group consisting of nickel, titanium, molybdenum, and alloys thereof, and the ring and lid are of stainless steel.

* * * * *